United States Patent [19]
Jackson

[11] Patent Number: 5,743,549
[45] Date of Patent: Apr. 28, 1998

[54] TRAILER LOCKING DEVICE

[76] Inventor: Emmanuel Jackson, 5 Grey Fox Sq., Taylors, S.C. 29687

[21] Appl. No.: 595,739

[22] Filed: Feb. 1, 1996

[51] Int. Cl.⁶ ........................................ B60D 1/06
[52] U.S. Cl. .................. 280/507; 280/511; 70/14; 70/232
[58] Field of Search ................... 280/504, 507, 280/511, 512; 70/14, 19, 232, 15, 17; 403/361, 56, 141, 143

[56] References Cited

U.S. PATENT DOCUMENTS

| | | | |
|---|---|---|---|
| 241,629 | 5/1881 | Deschamps | 280/511 |
| 3,307,857 | 3/1967 | Robertson | 280/511 |
| 3,374,268 | 3/1968 | Groves . | |
| 3,492,023 | 1/1970 | Thompson | 280/507 |
| 3,810,664 | 5/1974 | Nunnink, Jr. et al. . | |
| 4,181,320 | 1/1980 | Wellborn, Jr. | 280/507 |
| 4,325,237 | 4/1982 | Menzie | 70/14 |
| 4,861,062 | 8/1989 | Stidsen | 280/507 |
| 4,993,739 | 2/1991 | Putnam | 280/511 |
| 5,018,759 | 5/1991 | Villalon et al. . | |

FOREIGN PATENT DOCUMENTS 2245534  1/1992  United Kingdom ............ 70/232

*Primary Examiner*—Brian L. Johnson
*Assistant Examiner*—Gary Savitt
*Attorney, Agent, or Firm*—Dority & Manning, P.A.

[57] ABSTRACT

A trailer locking device adapted to be fixedly inserted into the cup of a trailer hitch. The locking device, which can be in the shape of a ball, includes an outer shell made from a plurality of movable plates. Once inserted into the cup of a trailer hitch, a locking mechanism is used to separate or otherwise move the plates apart in order to expand the size of the outer shell. Once locked into position, the trailer locking device becomes lodged within the cup of the trailer hitch preventing a trailer in association with the trailer hitch from being stolen.

17 Claims, 3 Drawing Sheets

TRAILER LOCKING DEVICE

BACKGROUND OF THE INVENTION

The present invention generally relates to a trailer locking device and, more particularly, to a trailer locking device adapted to be inserted into the cup of a trailer hitch and locked into position.

In general, the present invention is directed to a device that will prevent a trailer from being stolen. As used herein, a trailer refers to any vehicle or carrier that is designed to be towed by a motorized vehicle. Such trailers are normally connected to and drawn by a car or a truck.

Typically, trailers include an extension arm that is adapted to be mounted to the end of a motorized vehicle. In conventional trailer hitch assemblies, the extension arm of the trailer includes a socket or cup adapted to be placed over a ball affixed to the back of a car or truck. Once the cup is placed over the ball on the car or truck, the cup is secured to the ball by a latch which prevents the cup from being removed from the ball, but allows the cup to pivot on the ball.

Unfortunately, trailers that are left unattended and unattached to a vehicle are frequently stolen. For instance, an unauthorized person need only place the open cup portion of a trailer onto a complementary sized ball mounted onto a vehicle and drive off with the trailer and any contents loaded thereon. On some trailers, the cup can be locked into a ball-coupled position, but because the majority of the opening is still free, it is a simple matter for an unauthorized person to insert a smaller ball or other device into the cup and steal the trailer.

In view of these problems, others have attempted to design a trailer hitch or a device to be used with a trailer hitch for preventing the trailer from being stolen. For instance, in U.S. Pat. No. 3,810,664 to Nunnink, Jr. et al., a trailer vehicle anti-theft plug assembly is disclosed. The plug assembly includes a plug insertable into a socket of a trailer hitch that has a longitudinal extending cavity in communication with two transverse bores. Two spring-loaded pins are mounted in the bores of the plug, and a cylindrical lock is mounted in the cavity. When the lock is turned, the pins are moved outward where they are inserted into corresponding openings formed in the wall of the socket. The pins, thus, lock the plug assembly into position.

Other trailer hitch assemblies including locking devices are disclosed in U.S. Pat. No. 5,018,759 to Villalon et al., and U.S. Pat. No. 3,374,268 to Groves. As will be readily apparent from the description which follows, however, various features and aspects of the present invention are absent from the prior art.

The present invention is generally directed to further improvements in trailer anti-theft devices. The present invention is directed to a trailer locking device adapted to be fixedly inserted into the cup of a trailer hitch. The locking device includes an expandable outer shell that, after being inserted into the cup of a trailer hitch, can be expanded and secured within the cup. It thus becomes impossible to place the cup of the trailer hitch onto a complementary ball and steal the trailer.

SUMMARY OF THE INVENTION

The present invention recognizes and addresses various disadvantages and drawbacks concerning trailer hitch assemblies. Thus, broadly speaking, one main object of the present invention is to provide a trailer locking device for preventing a trailer from being stolen.

It is another object of the present invention to provide a trailer locking device that is adapted to be fixedly inserted into the cup of a trailer hitch.

It is another object of the present invention to provide a trailer locking device that includes an expandable outer shell that, once inserted into the cup of a trailer hitch, can be locked into position.

Additional objects and advantages of the invention are set forth in, or will be apparent to those of ordinary skill in the art from the detailed description which follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include but are not limited to, substitution of equivalent means and features or materials for those shown or discussed, and the functional or positional reversal of various parts, features or the like.

Still further, it is to be understood that different embodiments, as well as different presently preferred embodiments of this invention may include various combinations or configurations of presently disclosed features or elements, or their equivalents (including combinations or configurations thereof not expressly shown in the figures or stated in the detailed description). One exemplary such embodiment of the present invention relates to a trailer locking device adapted to be fixedly inserted into the cup of a trailer hitch.

The trailer locking device of the present invention can include an outer shell comprised of a plurality of moveable plates. The outer shell is expandable between a cup engaging position and a cup nonengaging position. The outer shell also defines an inner cavity.

A locking element is received within the inner cavity and is moveable towards and away from the outer shell. The locking element is configured to be moved into contact with the moveable plates causing the shell to expand and assume a cup engaging position.

The inner cavity defined by the outer shell can include an upper chamber. An end of the locking element can have a diameter greater than a diameter defined by the upper chamber, such that when the end of the locking element is moved into the upper chamber, the moveable plates are forcibly separated causing the outer shell to expand. The locking element can be received within a threaded bore located within the inner cavity for providing a means by which the locking element is moved towards and away from the outer shell.

The outer shell can include a substantially spherical portion and can be comprised of a first plate moveable towards and away from a second plate. Each of the plates can be equally shaped forming one half of the outer shell. The trailer locking device can further include a base secured to each of the plates. The base can define an aperture in communication with the inner cavity.

In order to lock the trailer locking device into position within the cup of a trailer hitch, the locking element can be connected to a key receiving member. The key receiving member can be adapted to receive a key for allowing the locking element to be moved towards and away from the outer shell. Further, the inner cavity can define an indented recess that is adapted to frictionally engage a portion of the locking element when the locking element is moved towards the outer shell.

These and other objects are also achieved by providing a trailer locking device adapted to be fixedly inserted into the cup of a trailer hitch. The locking device includes an outer shell expandable between a cup engaging position and a cup nonengaging position. The outer shell is comprised of a first plate and a second plate. The first plate is movable towards and away from the second plate. The outer shell can also define an inner cavity which can include an upper chamber. A threaded bore can be located within the inner cavity.

A base can be secured to each of the plates of the outer shell. The base can define an aperture in communication with the inner cavity.

The trailer locking device can also include a locking element retained within the threaded bore movable towards and away from the outer shell. The locking element can include a first end and a second end. The first end can have a diameter greater than a diameter defined by the upper chamber of the inner cavity. When the first end of the locking element is moved into the upper chamber, the first plate is forcibly moved away from the second plate causing the shell to expand and assume a cup engaging position. In this manner, the trailer locking device becomes lodged within the cup of a trailer hitch.

The locking element can be attached to or integral with a key receiving member. The key receiving member is adapted to receive a key for allowing the locking element to be moved towards and away from the outer shell.

Alternatively, the outer shell can define a channel for receiving a tool for facilitating removal of the locking device from the cup of a trailer hitch. Further, the outer shell can have one or more cup engaging elements positioned thereon. The cup engaging elements are for facilitating contact between the trailer locking device and the walls of a cup of a trailer hitch.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures in which.

Figure 1:
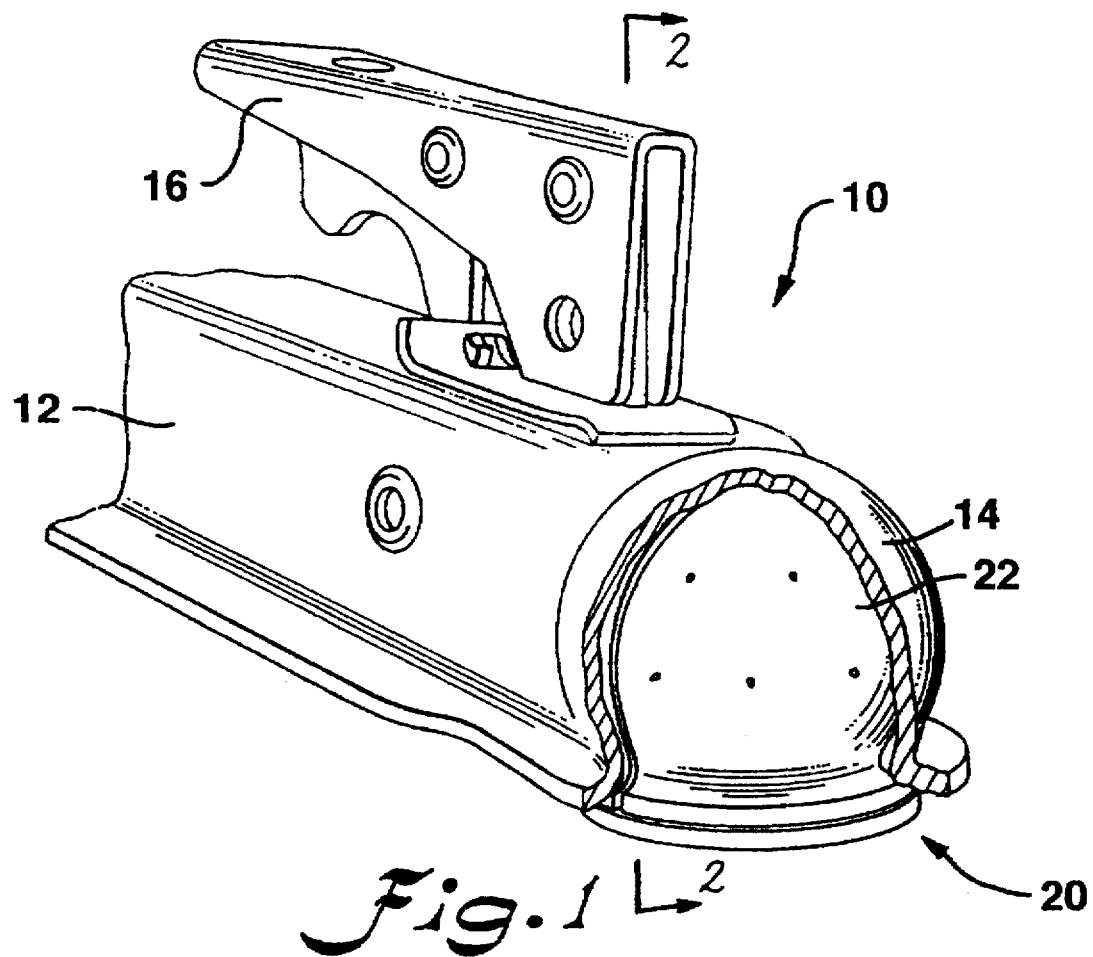
FIG. 1 is a perspective view with cut away portions of one exemplary embodiment of the present invention installed in a trailer hitch.

Repeat use of reference characters throughout the specification and appended drawings is intended to represent same or analogous features or elements of the invention.

DETAILED DESCRIPTION OF THE PREFERRED EMBODIMENTS

Reference will now be made in detail to the presently preferred embodiments of the invention, examples of which are fully illustrated in the accompanying drawings. Each example is provided by way of an explanation of the invention, not limitation of the invention. In fact, it will be apparent to those skilled in the art that various modifications and variations can be made in the present invention. For instance, features illustrated or described as part of one embodiment can be used on or with another embodiment to yield a still further embodiment. Additionally, certain features may be interchanged with similar devices or features not mentioned yet which perform the same or similar function.

In general, the present invention is directed to a locking device for a trailer. The device is adapted to be inserted into the cup of a trailer hitch and locked into position. Once installed, the trailer hitch cannot be used to connect the trailer to an unauthorized vehicle.

Referring to FIG. 1, a conventional trailer hitch generally 10 is shown. Trailer hitch 10 includes an extension arm 12 connected at one end to a trailer (not shown) and terminating at an opposite end with a cup or socket 14 adapted to engage a ball mounted to the rear of a vehicle.

Figure 2:
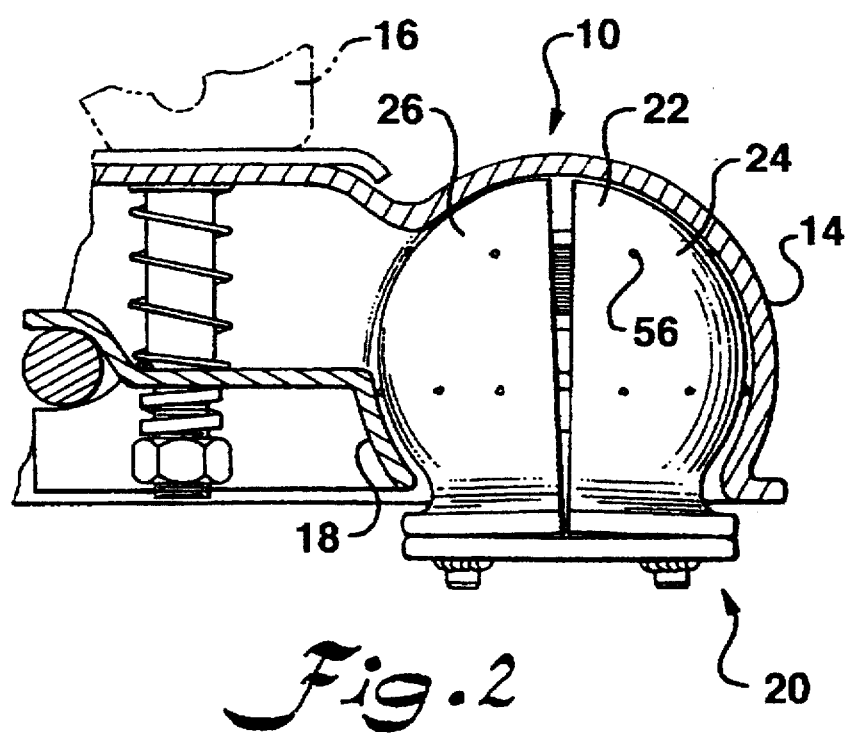
FIG. 2 is a cross sectional view along section line 2—2 of FIG. 1.

Trailer hitch 10 also includes a hitch securing lever 16. As shown in FIG. 2, when cup 14 is placed over a ball on the end of a vehicle, lever 16 can be used to secure cup 14 to the ball. Specifically, lever 16 is pivotally connected to a ball engaging arm 18. When lever 16 is placed in a position substantially parallel to extension arm 12 as shown in FIG. 1, ball engaging arm 18 pivots to secure a ball within cup 14 as shown in FIG. 2.

Trailer hitch 10 as illustrated in FIGS. 1 and 2 also appears in combination with a trailer locking device generally 20 made in accordance with the present invention. Referring to FIG. 1, trailer locking device 20 includes an outer shell 22 generally in the shape of a ball adapted to be inserted within cup 14. As shown in FIG. 2, outer shell 22, in this embodiment, includes a first plate 24 moveable towards and away from a second plate 26.

When trailer locking device 20 is placed in cup 14, first plate 24 is separated from second plate 26 causing outer shell 22 to expand. When the plates are separated as such, trailer locking device 20 becomes lodged or secured into place within cup 14 of trailer hitch 10. Cup 14 thus is prevented from receiving a ball or otherwise being connected to the back end of a vehicle. In this way, trailer locking device 20 prevents a trailer in association with trailer hitch 10 from being stolen.

Figure 3:
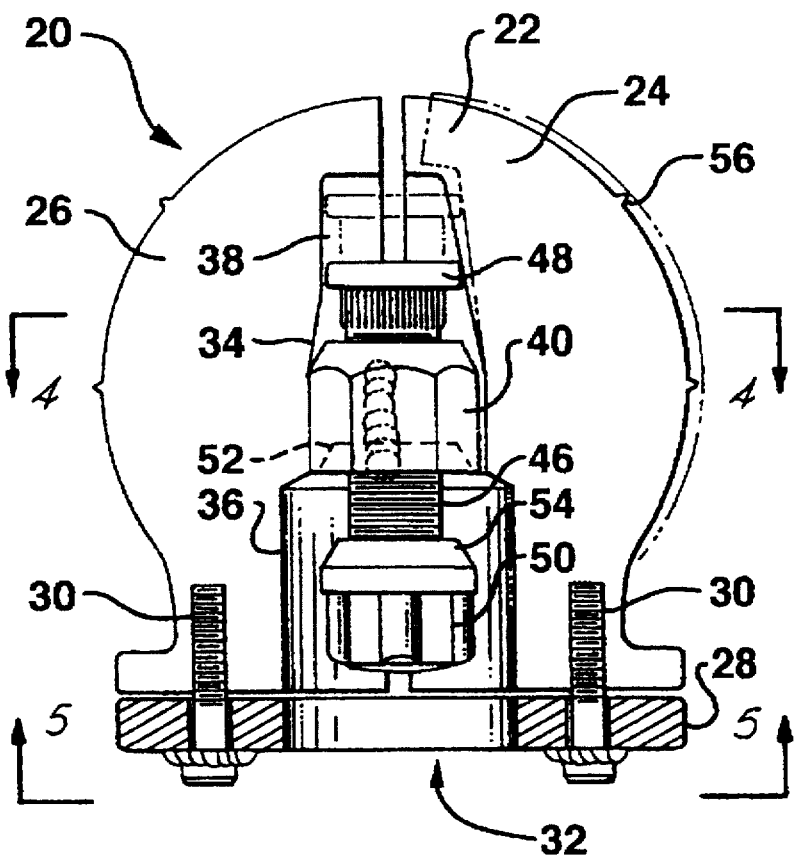
FIG. 3 is a cross sectional view of the embodiment illustrated in FIG. 1.
Figure 4:
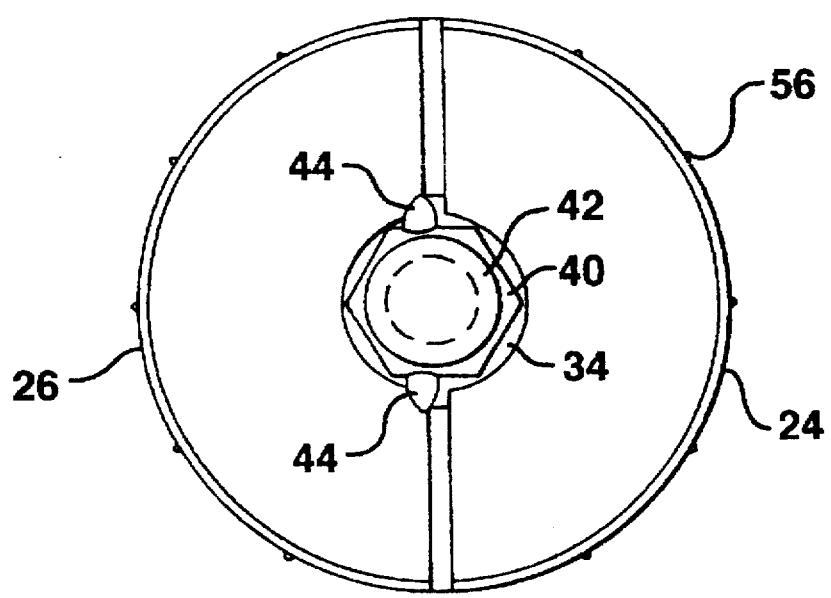
FIG. 4 is a cross sectional view along section line 4—4 of FIG. 3.
Figure 5:
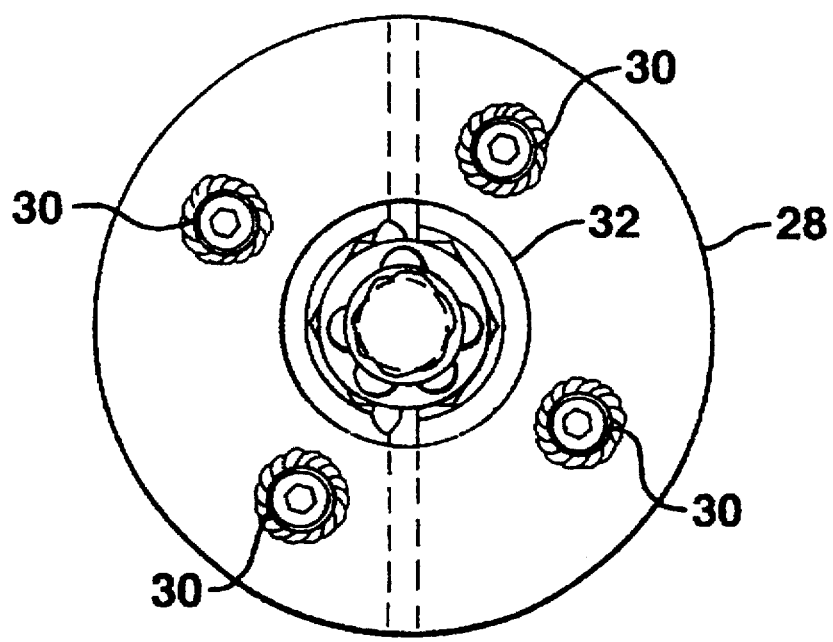
FIG. 5 is a plan view as seen from line 5—5 of FIG. 3.

Referring to FIGS. 3, 4 and 5, one embodiment of a mechanism for causing plates 24 and 26 of outer shell 22 to move away from each other or separate is illustrated. Referring to FIGS. 3 and 5, trailer locking device 20 includes a base 28 secured to plates 24 and 26 of outer shell 22. In particular, a plurality of screws 30 interconnect base 28 with plates 24 and 26. Screws 30 are of a length sufficient to allow plates 24 and 26 to move towards and away from each other at an end opposite to base 28.

Base 28 defines an aperture 32 which is in communication with an inner cavity 34 defined by outer shell 22. Inner cavity 34 includes a larger diameter lower chamber 36 and an upper chamber 38 having a smaller, tapering diameter. In between lower chamber 36 and upper chamber 38 is positioned an element retaining member or, as shown in this embodiment, a nut 40. As shown in FIG. 4, element retaining member 40 is welded to plate 26 as shown at 44 and defines a threaded bore 42.

Received within inner cavity 34 and retained within threaded bore 42 is a locking element 46. Locking element 46 as shown in phantom in FIG. 3, is longitudinally moveable within inner cavity 34 towards and away from outer shell 22. At one end of locking element 46 is an abutment structure 48 generally having a diameter larger than the diameter of upper chamber 38 of inner cavity 34.

When inserted into the cup of a trailer hitch, locking element 46 of trailer locking device 20 is placed in a position such that abutment structure 48 is not received within, upper chamber 38. After the trailer locking device is inserted into the cup, locking element 46 is moved upwards within cavity 34 such that abutment structure 48 is moved into upper chamber 38. Since the diameter of abutment structure 48 is larger than the diameter of upper chamber 38, locking element 46 forces first plate 24 to move away from second plate 26, causing outer shell 22 to expand in size. Once shell 22 is expanded within the cup of a trailer hitch, trailer locking device 20 becomes locked into position within the cup.

As shown in FIG. 3, opposite abutment structure 48, locking element 46 is connected to or integral with a key receiving member 50. Key receiving member 50 is designed to receive a key so that locking element 46 can be rotated and moved between a locked position in which abutment structure 48 is received within upper chamber 38 and an unlocked position. In this arrangement, a key or specially designed tool is required to lock and unlock trailer locking device 20 within the cup of a trailer hitch.

In the embodiment illustrated in FIG. 3, key receiving member 50 is in the shape of a MAG BOLT. A MAG BOLT is a bolt designed to receive a particularly shaped wrench or tool. When using a MAG BOLT, lower chamber 36 of inner cavity 34 should have an increased diameter for allowing a tool to completely encircle and surround key receiving member 50. In alternative embodiments, however, key receiving member 50 can include a lock adapted to receive a conventionally shaped key that, once inserted, allows locking element 46 to be moved within inner cavity 34.

As also shown in FIG. 3, optionally, retaining member 40 can include an indented recess 52. Indented recess 52 is adapted to conform to the shape of an inclined surface 54 on key receiving member 50. In this embodiment, when locking element 46 is moved into a locked position, incline surface 54 becomes received within indented recess 52. A frictional engagement thus occurs between key receiving member 50 and element retaining member 40. It thus becomes more difficult to move locking element 46 downwards without having access to a key or tool designed to engage key receiving member 50.

Trailer locking device 20 as illustrated in FIGS. 1 through 5 represents one preferred embodiment of the present invention. However, various modifications and variations can be made without departing from the spirit and scope of the invention. For instance, instead of outer shell 22 being comprised of two equally shaped plates 24 and 26, the number, the shape, and the position of the plates can vary. For example, alternatively outer shell 22 can include one or more plates hinged thereto that move outwards when locking element 46 is placed in a locked position.

Optionally, trailer locking device 20 can also include cup engaging elements positioned on outer shell 22 for facilitating engagement with the cup of a trailer hitch when trailer locking device 20 is installed therein. For instance, as shown in FIGS. 1, 2, 3, and 4 the cup engaging elements can be in the form of small protrusions 56.

Figure 6:
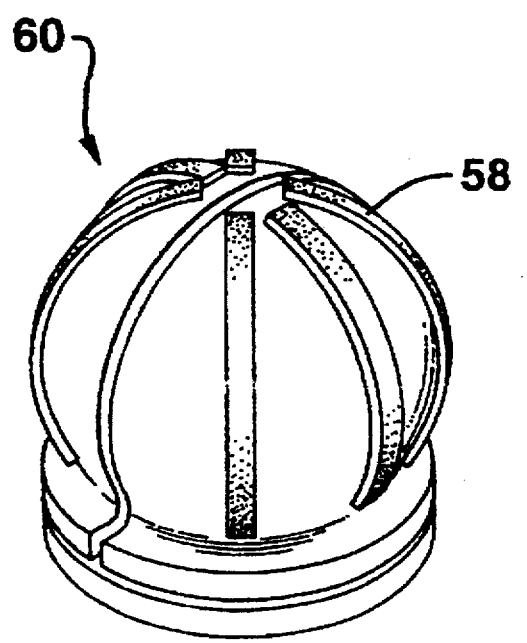
FIG. 6 is a perspective view of another embodiment of the present invention.

Referring to FIG. 6, an alternative embodiment of a trailer locking device generally 60 is shown. In this embodiment, the cup engaging elements are in the form of foam or rubber strips 58 secured to outer shell 22. Preferably, strips 58 are made from a material that will grip the inner walls of a cup of a trailer hitch.

In general, the trailer locking device of the present invention can be made from any suitable structural material. For instance, trailer locking device 20 can be made from a metal, a hard rubber material, a plastic material, or even wood. Further, different parts of trailer locking device 20 can be made from different materials.

While particular embodiments of the invention have been described and shown, it will be understood by those of ordinary skill in the art that the present invention is not limited thereto since many modifications may be made without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A trailer locking device adapted to be fixedly inserted into a cup of a trailer hitch, said locking device comprising:
   a body;
   said body formed by an outer shell and a base, said outer shell formed by a plurality of moveable plates, said moveable plates being moveable with respect to said base and expandable between a cup engaging and cup nonengaging position, and wherein said outer shell is capable of engaging and disengaging a top and a side of a cup of a trailer hitch, said outer shell defining an inner cavity; and
   a locking element received within said inner cavity, said locking element being moveable towards and away from said outer shell, said locking element being configured to be moved into contact with said movable plates causing said shell to expand and assume said cup engaging position;
   a key receiving member connected to said locking element, said key receiving member being adapted to receive a key, said key receiving member being capable of moving said locking element towards and away from said outer shell, and wherein said locking element engages said outer shell to move said outer shell to a cup engaging position and said locking element disengages said outer shell to cause said outer shell to move to a cup nonengaging position.

2. A trailer locking device as defined in claim 1, wherein said outer shell includes a substantially spherical portion having a shape adapted to be inserted into a cup of a trailer hitch.

3. A trailer locking device as defined in claim 1, further including a threaded bore located within said inner cavity, for retaining said locking element.

4. A trailer locking device as defined in claim 1, wherein:
   said inner cavity includes an upper chamber; and
   said locking element includes an end adapted to engage said .outer shell, said end of said locking element having a diameter greater than a diameter defined by said upper chamber such that, when said end of said locking element is moved into said upper chamber, said movable plates are forcibly separated causing said outer shell to expand.

5. A trailer locking device as defined in claim 1, wherein said outer shell includes a first plate and a second plate, said first plate being movable towards and away from said second plate, each of said plates forming a half of said outer shell.

6. A trailer locking device as defined in claim 1, further comprising a base secured to said outer shell, said base defining an aperture in communication with said inner cavity.

7. A trailer locking device as defined in claim 1, wherein said inner cavity defines an indented recess adapted to frictionally engage a portion of said locking element when said locking element is moved towards said outer shell.

8. A trailer locking device as defined in claim 1, wherein said outer shell defines an outer surface, said outer surface including at least one cup engaging element.

9. A trailer locking device adapted to be fixedly inserted into a cup of a trailer hitch, said locking device comprising:

a body;

said body formed by an outer shell and a base, said outer shell including a spherically shaped portion said outer shell formed by a plurality of moveable plates, said moveable plates being moveable with respect to said base and expandable between a cup engaging and cup nonengaging position, and wherein said outer shell is capable of engaging and disengaging a top and a side of a cup of a trailer hitch, said outer shell defining an inner cavity; and a locking element received within said inner cavity, said locking element being moveable towards and away from said outer shell, said locking element being configured to contact with said outer shell and to forcibly separate said moveable plates causing said shell to expand and assume said cup engaging position;

a key receiving member connected to said locking element, said key receiving member being adapted to receive a key, said key receiving member being capable of moving said locking element towards and away from said outer shell, and wherein said locking element engages said outer shell to move said outer shell to a cup engaging position and said locking element disengages said outer shell to cause said outer shell to move to a cup nonengaging position.

10. A trailer locking device as defined in claim 9, further including a threaded bore located in said inner cavity, for retaining said locking element.

11. A trailer locking device as defined in claim 9, wherein said inner cavity includes an upper chamber and wherein said locking element includes an end adapted to engage said outer shell, said end of said locking element having a diameter greater than a diameter defined by said upper chamber of said inner cavity such that, when said end of said locking element is moved into said upper chamber, said moveable plates are forcibly separated causing said outer shell to expand.

12. A trailer locking device as defined in claim 9, wherein said outer shell includes a first plate moveable towards and away from a second plate.

13. A trailer locking device as defined in claim 9, wherein said inner cavity defines an indented recess adapted to frictionally engage a portion of said locking element when said locking element is moved towards said outer shell.

14. A trailer locking device as defined in claim 9, wherein said moveable plates are interconnected.

15. A trailer locking device adapted to be fixedly inserted into a cup of a trailer hitch, said locking device comprising:

a body;

said body formed by an outer shell and a base, said outer shell formed by a first plate and a second plate, said first plate being moveable towards and away from said second plate; said first plate and said second plate being moveable with respect to said base and expandable between a cup engaging and cup nonengaging position, and wherein said outer shell is capable of engaging and disengaging a top and a side of a cup of a trailer hitch;

an inner cavity defined by said outer shell, said inner cavity including an upper chamber;

said base secured to each of said plates of said outer shell, said base defining an aperture in communication with said inner cavity;

a threaded bore located in said inner cavity; and a locking element retained within said threaded bore moveable towards and away from said outer shell, said locking element including a first end and a second end, said first end having a diameter greater than a diameter defined by said upper chamber of said inner cavity, wherein, when said first end of said locking element is moved into said upper cavity, said first plate is forcibly moved way from said second plate causing said shell to expand and assume said cup engaging position;

a key receiving member connected to said locking element, said key receiving member being adapted to receive a key, said key receiving member being capable of moving said locking element towards and away from said outer shell, and wherein said locking element engages said outer shell to move said outer shell to a cup engaging position and said locking element disengages said outer shell to cause said outer shell to move to a cup nonengaging position.

16. A trailer locking device as defined in claim 15, wherein said inner cavity defines an indented recess adapted to frictionally engage a portion of said locking element when said locking element is moved towards said outer shell.

17. A trailer locking device as defined in claim 15, wherein said outer shell defines an outer surface, said outer surface including a channel adapted to receive a tool for facilitating the removal of said locking device from a cup of a trailer hitch.

* * * * *